US005214981A

United States Patent [19]

Weinberger et al.

[11] Patent Number: 5,214,981

[45] Date of Patent: Jun. 1, 1993

[54] FLYWHEEL ENERGY STORAGE WITH SUPERCONDUCTOR MAGNETIC BEARINGS

[75] Inventors: Bernard R. Weinberger, Avon; Lahmer Lynds, Jr., Glastonbury, both of Conn.; John R. Hull, Hinsdale, Ill.

[73] Assignee: ARCH Development Corporation, Chicago, Ill.

[21] Appl. No.: 736,677

[22] Filed: Jul. 26, 1991

[51] Int. Cl.[5] ........................ F16C 39/06; F16F 15/00; H01L 39/12

[52] U.S. Cl. .................................... 74/573 R; 74/572; 501/1

[58] Field of Search ................. 505/701, 1; 74/573 R, 74/572, 5.46, 5.7

[56] References Cited

U.S. PATENT DOCUMENTS

| | | | |
|---|---|---|---|
| 4,132,130 | 1/1979 | Schneider | 74/572 |
| 4,870,310 | 9/1989 | Triplett | 74/572 X |
| 4,886,778 | 12/1989 | Moon et al. | |
| 4,939,120 | 7/1990 | Moon et al. | 505/1 |
| 4,961,352 | 10/1990 | Downer et al. | 74/5.46 |

OTHER PUBLICATIONS

"Magnetic Forces in High-$T_c$ Superconducting Bearings", F. C. Moon, published in Applied Electromagnetics in Materials, vol. 1 (1990), pp.29-35.

"High-speed Rotation of Magnets on High $T_c$ Superconducting Bearings", F. C. Moon et al. published in Appl. Phys. Lett., vol. 56 (4), Jan. 22, 1990, pp. 397-399.

"Satellite Power Using a Magnetically Suspended Flywheel Stack", J. A. Kirk et al. published in J. of Power Sources, vol. 22 (1988), pp. 301-311.

"Rotor Dynamics of Flywheel Energy Storage Systems", C. P. Jayaraman et al, published in Journal of Solar Energy Engineering, vol. 113, Feb. 1991, pp. 11-18.

"A new Process with the Promise of High $J_c$ in Oxide Superconductors", J. Murakami et al, published in Japanese Journal of Applied Physics, vol. 28, No. 7, Jul. 1989, pp. 1189-1194.

"Levitation Forces, Relaxation and Magnetic Stiffness of Melt-Quenched $YBa_2Cu_3O_x$", F. C. Moon, et al, published in Japanese Journal of Applied Physics, vol. 29, No. 7, Jul. 1990, pp. 1257-1258.

*Primary Examiner*—Leslie A. Braun
*Assistant Examiner*—Andrea Pitts
*Attorney, Agent, or Firm*—Reinhart, Boerner, Van Deuren, Norris & Rieselbach

[57] ABSTRACT

A flywheel having superconductor bearings has a lower drag to lift ratio that translates to an improvement of a factor of ten in the rotational decay rate. The lower drag results from the lower dissipation of melt-processed YBCO, improved uniformity of the permanent magnet portion of the bearings, operation in a different range of vacuum pressure from that taught by the art, and greater separation distance from the rotating members of conductive materials.

24 Claims, 3 Drawing Sheets

102
106 111
104
110
107
10
105
90
VAC. PUMP
120
170
130
160
140
150
50
165
120
110
107
105
106
111
104
102

102
106
111
104
110
107
10
105
90
VAC. PUMP
120
170
130
160
140
150
50
165
120
110
107
105
106
111
104
102

110'
150
160
120'
145
140
110'

FLYWHEEL ENERGY STORAGE WITH SUPERCONDUCTOR MAGNETIC BEARINGS

The Government has rights in the invention pursuant to Contract W-31-109-ENG-38 between the Department of Energy and Argonne National Laboratory.

TECHNICAL FIELD

The field of the invention is that of magnetic bearings as applied to levitation with a superconducting material.

BACKGROUND ART

U.S. Pat. No. 4,939,120 illustrates a magnetic bearing employing a type 2 superconductor that employs one of the high temperature superconducting ceramic materials. This patent illustrates various forms of magnetic bearings.

Another reference is "Magnetic Forces in High-$T_c$ Superconducting Bearings" by F. C. Moon, published in Applied Electromagnetics in Materials, 1 (1990) 29–35 Elsevier. This paper discloses various drag effects on the magnetic bearings including that of irregularities in the magnetic field. FIG. 3 indicates no dependence of angular frequency decay rate on pressure.

DISCLOSURE OF INVENTION

The invention relates to an improved superconducting bearing, that has markedly less "friction" or "drag" than prior art devices.

One feature of the invention is the use of a superconducting material that is directionally solidified so that the "C" axis is oriented parallel to the direction of lift.

A feature of the invention is that the permanent magnet used is formed in a highly uniform magnetic field, so that the individual domains of the permanent magnet are aligned with a high degree of uniformity. This permanent magnet could be a conventional permanent magnet or a trapped flux superconductor magnet.

Another feature of the invention is that the superconducting material has an oriented crystal structure together with large grains of the material and enhanced flux pinning. This oriented superconductor could be in thin film ($<5$ $\mu$m ) form.

Another feature of the invention is the use of a vacuum enclosure having a vacuum below a critical value.

Yet another feature of the invention is separation of stationary metallic members from the rotating members.

Other features and advantages will be apparent from the specification and claims and from the accompanying drawings which illustrate an embodiment of the invention.

BEST MODE FOR CARRYING OUT THE INVENTION

The prior art has suggested the use of flywheels mounted on conventional magnetic bearings for short term storage of energy for buses, satellites or other applications where the energy is to be stored for a time on the order of a few minutes, or where a larger energy dissipation over longer periods of time is tolerated. A limiting factor of prior art devices has been the drag to lift ratio of the bearing. For a conventional material in sliding contact, this ratio is the coefficient of friction. It is a convenient way of summarizing the effect of the loss mechanisms that limit the storage time. For example, the above-cited paper by Moon illustrates a decay time for an initial rotation on the order of 1000 Hz to decay to zero Hz on the order of 10 seconds. For a state of the art magnetically levitated flywheel using conventional magnetic bearings employing permanent magnets and electromagnets and requiring active control employing position sensors and feedback systems, such as that shown in C. P. Jayaraman et. al., J. of Solar Eng. 113, 11 (1991), there is a loss that is typically a loss of about 1% of the stored energy per hour due to the bearings. This translates to a loss of 24% per day, which renders long term energy storage, such as diurnal storage of electrical energy impractical. With the aid of the invention, the drag to lift ratio has been reduced from a prior art value of $10^{-4}$ to a value of $4\times10^{-6}$, which translates to a loss on the order of 0.1% per hour or 2.4% per day.

Figure 1:
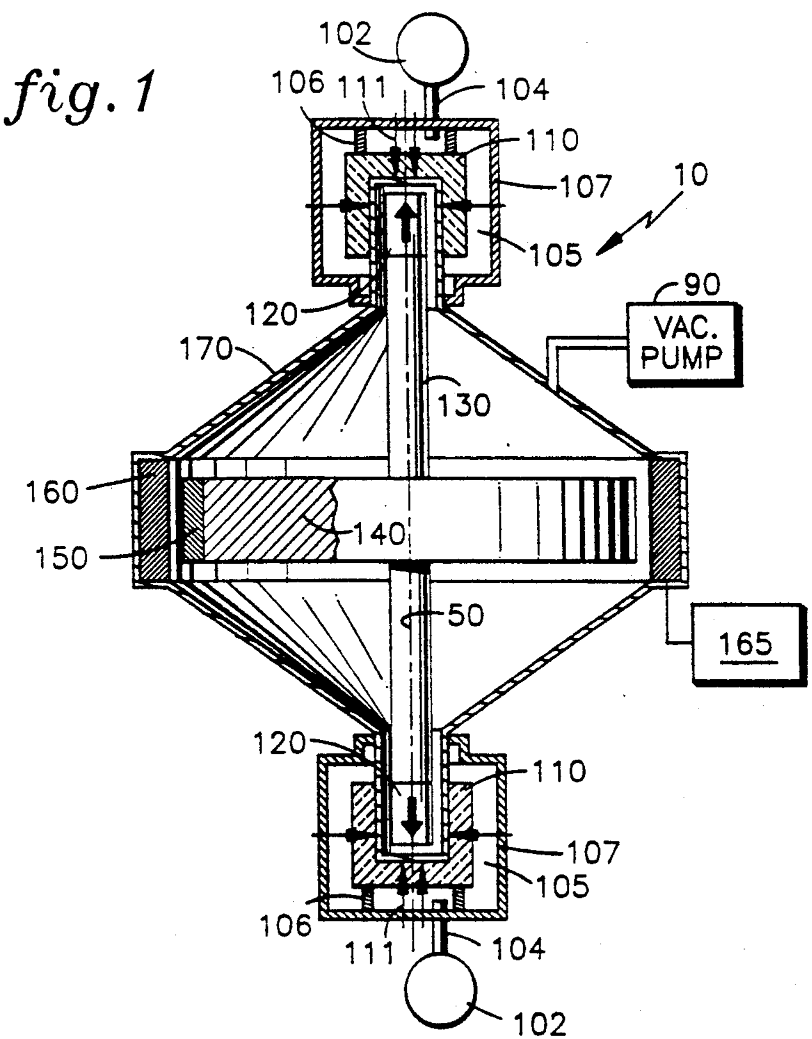
FIG. 1 illustrates in partially pictorial, partially schematic form, a flywheel constructed according to the invention.

Referring now to FIG. 1 there is shown a flywheel 10 in which a shaft 130, oriented vertically in the drawing, is supported by superconducting bearings 110 that consist of a superconductor material surrounding permanent magnets 120 on either tip of shaft 130. FIG. 1 illustrates a vertically mounted flywheel supported by a thrust bearing. The main force is directed downward, i.e. the lift direction is vertical, and the sides of the bearing have to exert relatively little force. The flywheel could also be mounted horizontally, in which case the orientation of the superconductor C-axis would be readjusted to point in the lift direction, which is perpendicular to the shaft axis. The term "direction of lift" will be taken to mean primarily the direction that supports the weight of the flywheel and secondarily the direction along which levitation force is exerted. Those skilled in the art will appreciate that the version of FIG. 1 is adapted to a material that is directionally solidified parallel to the shaft axis. In a horizontal embodiment, the material is preferably oriented with the C-axis perpendicular to the shaft, since the bottom of the superconductor cup and the portion lying in a horizontal plane through the shaft axis will need to exert relatively little force. That portion of the superconductor, whether a bearing or a magnetic tip, that supports the weight of the flywheel will be referred to as the lifting portion. It is less important that the other portions have their C-axes aligned.

Superconductors 110 are cooled by a liquid nitrogen refrigerator 102 connected by a refrigerant line 104 to a cooling vessel 105. Liquid nitrogen coolant in the cooling vessel is in thermal contact with superconductor 110, which is mechanically supported by supports indicated schematically by blocks 106 and is insulated by insulator 107.

The flywheel, denoted generally by the numeral 140, is enclosed in a vacuum vessel 170 in order to reduce the effects of friction from gas on the flywheel. The flywheel has a conventional input/output mechanism referred to generally as energy transfer means and consisting of a set of permanent magnets denoted with the numeral 150 and electromagnets denoted with the numeral 160 to inject power and increase the spinning rate of the flywheel or to extract power as the case may be. A box labeled 165 denotes a conventional set of electronic circuits to drive the electromagnets in a conventional manner. Such a system is illustrated in J. A. Kirk and D. K. Anand, J. of Power Sources 22, 301 (1988).

An arrow represents the "C" axis of material 110, which is preferably a high temperature superconducting material such as Y-Ba-Cu-0 (YBCO). The axis will be referred to as the solidification axis of the material. This material could be in bulk form or in thin film form deposited on an appropriate lattice-matched substrate.

Figure 2:
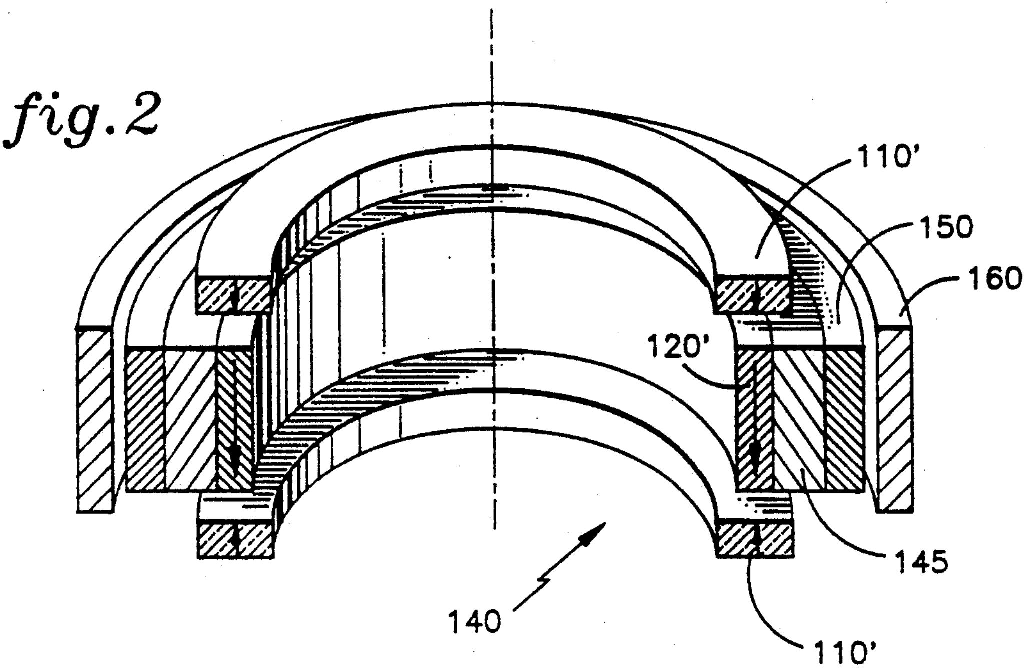
FIG. 2 illustrates in cross sectional form an alternative embodiment of a flywheel.

Referring now to FIG. 2 there is shown in cross section of an alternative embodiment of flywheel 140. In this embodiment, the flywheel is suspended by a superconductor and a permanent magnet that are located at the flywheel rather than at the ends of shaft 130. The flywheel 140 has an inner surface that is formed by a permanent magnet 120, which may be a continuous cylindrical shell or a set of individual magnets. These permanent magnets are levitated by high temperature superconductors denoted schematically by a ring and by a label 110'. These materials are the same as that shown for FIG. 1. An intermediate layer of material denoted with the numeral 145, such as a high strength graphite epoxy composite, provides mass to the flywheel for efficiently storing rotating energy. At the outer rim of flywheel 140 there is a layer denoted with the numeral 150 which is a set of permanent magnets that are the same energy transfer input/output set as indicated in FIG. 1. A corresponding set of electromagnets 160 perform the same functions as counterparts in FIG. 1.

Figure 3:
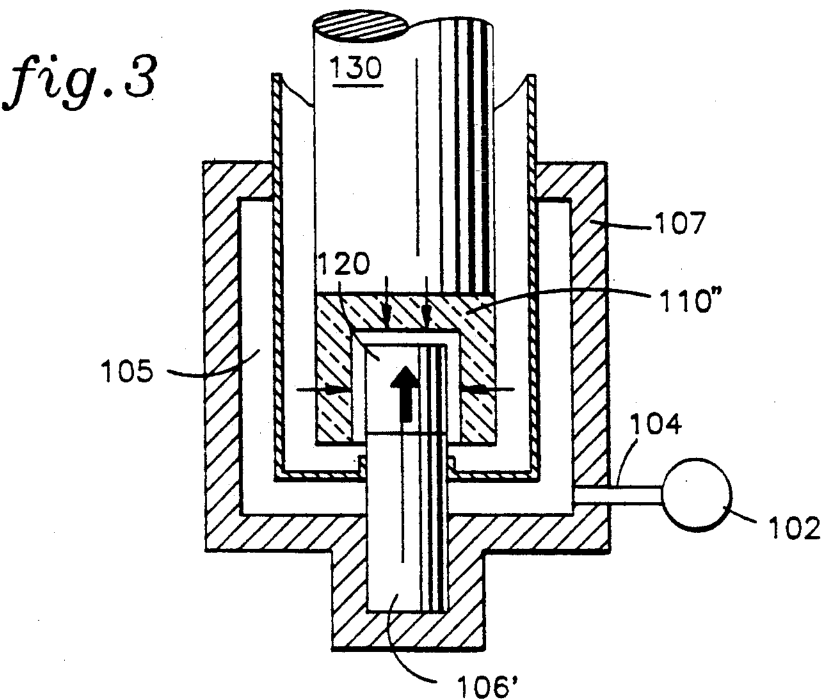
FIG. 3 illustrates in cross section another alternative embodiment.

Referring now to FIG. 3, there is shown an alternative embodiment of the invention in which the superconducting material 110", aligned as before, is located on the shaft 130. The refrigerant 102 and pipe 104 connect to a nitrogen cold bath 105 which surrounds the tip of the shaft 130 and also permanent magnet 120' supported by support 106', which aligns the bearing about magnet 120'. The material of magnet 120' is the same permanent magnet of FIG. 1. Cooling of material 110' is effected by radiational cooling between vessel 170 and the tip of the shaft. Insulator 107 and coolant bath 105 are indicated schematically as extending up along the shaft. In operation, there will be a heat loss through the general material of the vacuum enclosure. Cooled vessel 170 must absorb sufficient heat to maintain superconductor 110" below the critical temperature. The size and dimension of the bearing material and insulator thickness and location, in particular the length along shaft 130 that bath 105 must extend in order to maintain the correct temperature in material 110' will be the result of the usual engineering tradeoffs.

Figure 4:
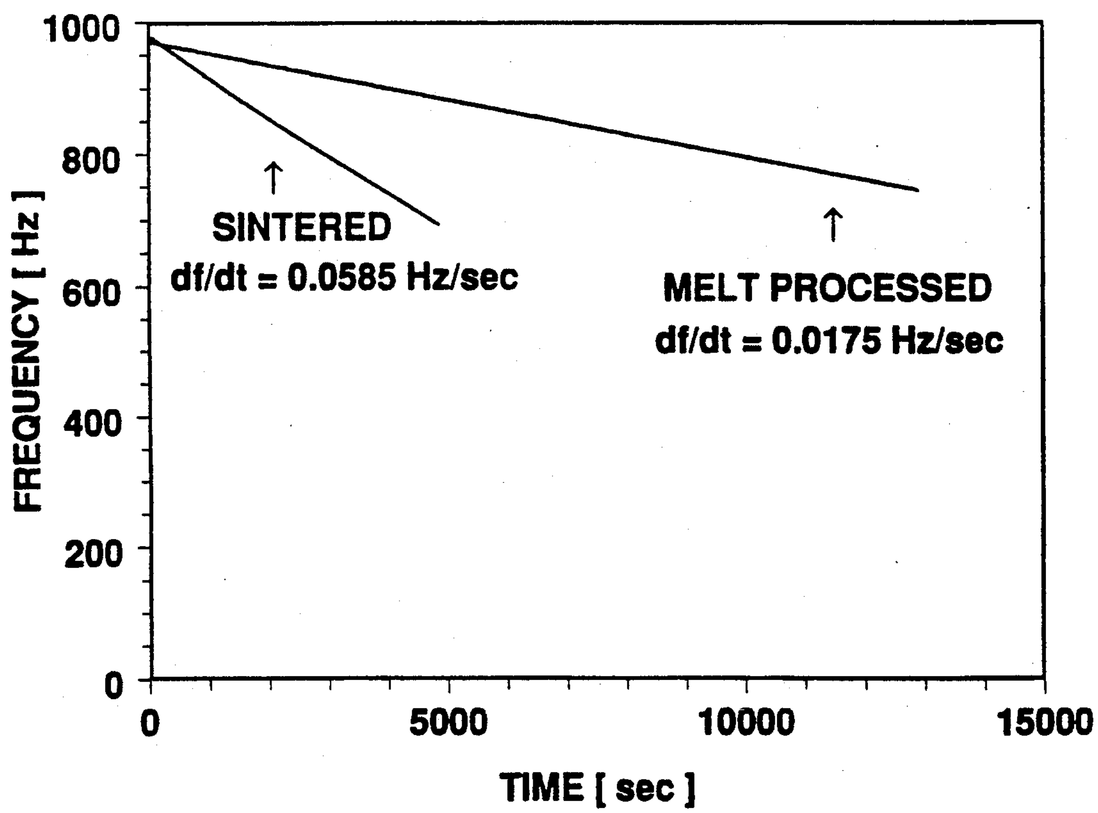
FIG. 4 illustrates the relationship of the decay rate for different materials.

Referring now to FIG. 4, there is shown graphically two curves indicating the dependence of rotational frequency of a test sample on elapsed time. Two samples of YBCO, a conventional high temperature superconductor, were used. The first sample having the higher decay rate was a conventional sintered material. The second sample was melt processed, which means that it was partially melted and slowly cooled through its solidification temperature. A temperature gradient was maintained across the sample during cooling.

The advantage of the melt processed material is that under appropriate conditions, such as those specified in M. Murakami et. al. Japanese Journal of Applied Physics 28, 1189 (1989), in which the material is pulled slowly from a melt, large grains will form. These large grains permit the efficient generation of superconducting currents over a relatively large volume without crossing a grain boundary. In conventional sintered materials, the grain size is about one hundredth the size obtainable with melt-processed material, being about 0.001 cm for the sintered material and about 0.1 cm for the melt-processed material. Also, the axis of the material is aligned to a high degree by use of a starting seed crystal. There are two advantages in using a melt processed material. First, such material can generate a larger levitation force, so that a smaller bearing surface area is required. Secondly, the data in FIG. 4 indicate that loss mechanisms are much less in bearings of this type than in sintered materials. As was described above, there is a dramatic difference of a factor of ten in the rate of decay of angular frequency with time for the two materials.

An important advantage of the higher levitational force provided by this material is that, since the superconductor bearing surface can be smaller, the cooling load is correspondingly reduced compared with alternative types of superconducting bearings.

High temperature superconductors can be grown in a near perfect single crystalline, well oriented thin film form. They can display a current carrying capability (and therefore levitation capability) much superior to bulk material. Furthermore, the large geometric aspect ratio of the thin films can produce a strong internal enhancement of applied magnetic fields. Therefore, despite the fact that there is far less superconducting material in a thin film than in a bulk sample, thin films can produce large levitation forces. An alternative embodiment employs thin films of high temperature superconductors such as YBCO deposited on an appropriate lattice-matched substrate.

The use of a thin film of YBCO on a YBCO substrate has an additional advantage in that the magnetic field that is to be countered by the superconductor will have a large DC component and a relatively small AC component that includes the effect of inhomogeneity in the field from permanent magnet 120. The thin film, being composed of a better quality material than the bulk, will be able to damp out inhomogeneities in the AC component better than the bulk, while the bulk will be able to handle the DC component even if it is of lesser quality. Thus, a thin film will be able to reduce friction without necessarily being capable of producing all the levitation pressure that is required. The requirement for a useful thin film is thus reduced, since it need not be thick enough to provide all the levitation.

Figure 5:
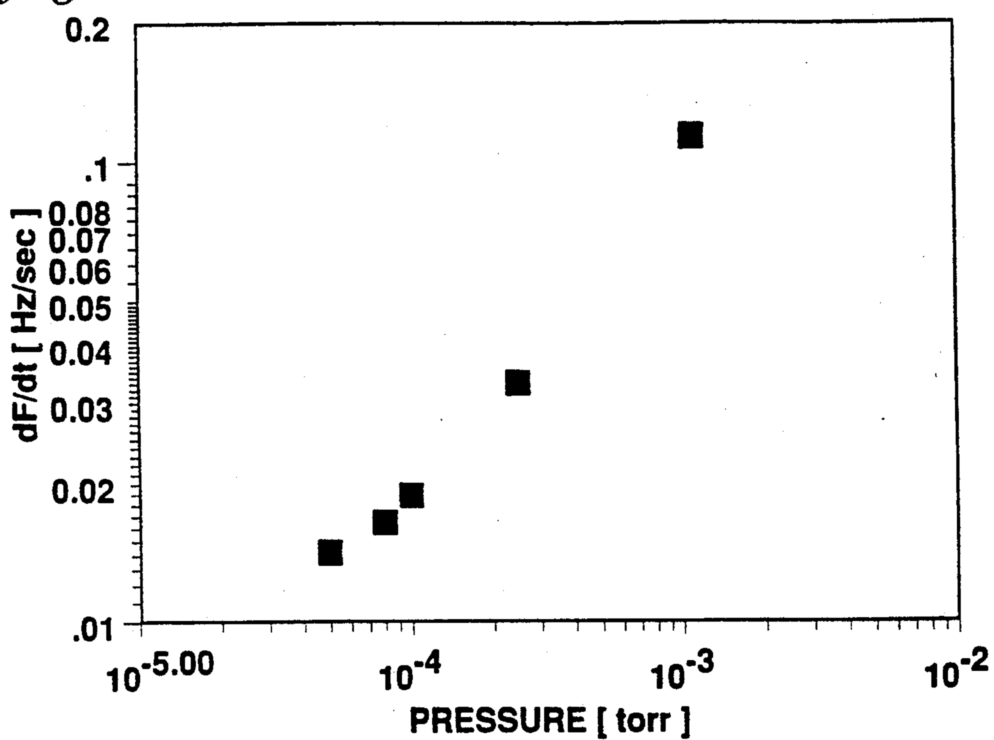
FIG. 5 illustrates the dependence of drag on pressure.

Referring now to FIG. 5, there is shown a curve indicating the dependence of drag on pressure. The above-cited article by Moon shows in FIG. 3 a plot of rotor spin decay versus time for two vacuum pressures differing by a factor of four. One skilled in the art would infer from the fact that the curves are superimposed, the conclusion that spin decay rate was not sensitive to vacuum pressure at 11$\mu$ of Hg and below.

As can be seen in the Figure, the drag decreases smoothly until a break in the decay rate curve at a pressure value of about $10^{-4}$ Torr. Below that pressure, unexpectedly, the curve levels out so that there is a point of diminishing returns that is between about $8\times10^{-5}$ and $10^{-4}$ Torr.

Figure 6:
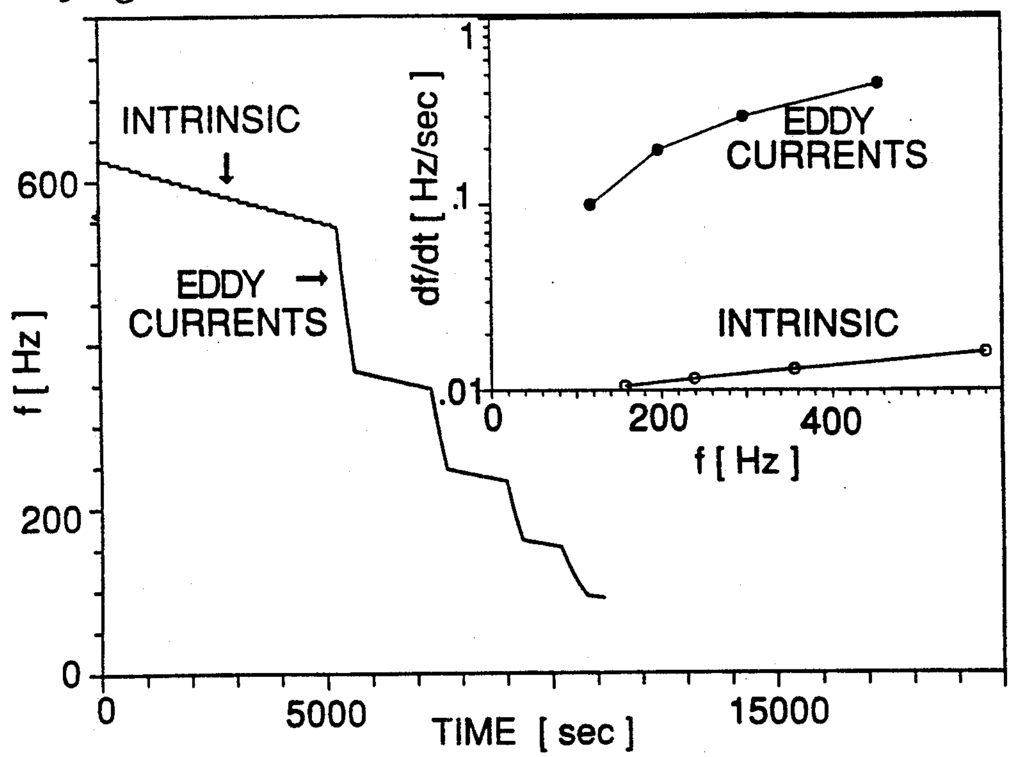
FIG. 6 illustrates the effect of eddy currents in conducting materials that are close to the rotating magnet.

Referring now to FIG. 6, there is shown the effect of eddy currents in normal metals positioned near a permanent magnet rotor. In this case a SmCo rotor was spun and allowed to decay at a certain intrinsic rate given by the first section of the curve. A one mm. thick aluminum plate was brought close to (one centimeter away from) the magnet resulting in the very sharp rotational frequency decay rate. Repeated alternation between the intrinsic rate and the rate when the eddy currents are present indicate that there is a considerable benefit from keeping conducting materials away from any of the rotating magnets, either the magnet in the bearing or the magnet in the input/output section. For example, it may be preferable to have the section 160 of the input/output device retractable so that it may be moved away from the rotor in order to reduce these eddy current loses.

An alternative embodiment of the invention has vacuum vessel 170 fabricated from non-conductive material such as fiberglass epoxy or composites, so that eddy currents in the vessel will not be a problem. Possible losses due to eddy currents in the rotating permanent magnet induced by stationary trapped flux within the superconductor could be ameliorated through the use of non-conducting ferrite permanent magnets.

In order to produce the lowest total drag, a number of aspects of the apparatus should be improved relative to the prior art. The largest single improvement is the unexpectedly low dissipation rate that is associated with the use of aligned melt-processed superconducting material. In the permanent magnet, uniformity in the magnetic field about its axis of rotation is important to reduce drag. Uniform permanent magnets can be produced using a combination of a uniform magnetizing field having a strength exceeding 10 Tesla and using a starting material having uniform grain size and crystal structure. In addition, placing a thin plate or shell of soft iron or nickel on either side of the permanent magnet will smooth out residual inhomogeneities. In FIG. 1, for example, a thin plate of soft iron would be placed on either end of permanent magnet 120. Similarly, a thin ring of soft iron would be placed over the top and bottom of ring 120'. Those skilled in the art will appreciate that different applications will be able to tolerate more or less uniformity in the permanent magnet. Preferably, the net field resulting from both the applied magnetizing field and the material fabrication should be uniform to less than 0.1% as a function of azimuthal angle about the axis of rotation of the permanent magnet.

Drag that is caused by the residual atmosphere in the vacuum vessel may be reduced, in addition to pumping to a high vacuum, by flushing the vessel with nitrogen, a noble gas, or other non-paramagnetic gases before pumping. Oxygen is highly paramagnetic and will contribute to magnetic drag as well as to mechanical drag caused by collision with the residual gas. Preferably, the flushing is continued until the residual fraction of oxygen is less than $10^{-4}$ Torr.

The vacuum can be improved by maintaining the entire vacuum vessel at a cryogenic temperature because the vessel walls then act as a cryopump, improving the vacuum. An alternate form for the permanent magnet allowed by this configuration is that of a trapped flux high temperature superconductor magnet. If a high quality superconductor (one with appreciable flux pinning) is cooled below its critical temperature in a high magnetic field, it will trap an appreciable amount of the magnetic flux passing through it. Such a superconductor could be either in bulk or in thin film form. When the magnetizing field is removed, the trapped flux will remain, forming a "permanent" trapped flux magnet as long as the temperature is maintained below the critical temperature of the material. An advantageous feature of this approach is that the trapped flux can be much greater than the saturation flux of conventional permanent magnets. Those skilled in the art will appreciate that such a trapped flux magnet must be either magnetized in situ or maintained below the critical temperature while it is incorporated into the flywheel assembly after magnetization. The terms vertical and horizontal have been used with their ordinary meanings. Those skilled in the art will readily appreciate that in space applications, the terms merely refer to perpendicular axes.

It should be understood that the invention is not limited to the particular embodiments shown and described herein, but that various changes and modifications may be made without departing from the spirit and scope of this novel concept as defined by the following claims.

We claim:

1. A system for storing energy in a flywheel suspended by magnetic levitation in a vacuum vessel comprising:

a rotatable member having a rotation axis in a central shaft, said shaft having first and second magnetic tips formed from permanent magnets on opposite ends thereof, superconductor magnetic bearings, positioned to support said first and second magnetic tips and supported in turn by bearing support means, said superconductor magnetic bearings having a main direction of lift;

cooling means in thermal contact with said bearing support means; and energy transfer means, connected to said rotatable member, for transferring energy into and extracting energy from said rotatable member, characterized in that:

at least one of said superconducting bearings includes a lifting portion comprising melt-processed, directionally solidified material structure having a crystal structure C-axis oriented parallel to said main direction of lift.

2. A system according to claim 1, further characterized in that:

said vacuum vessel has a vacuum pressure of less than $10^{-4}$ Torr.

3. A system according to claim 1, further characterized in that:

said superconductor material is bulk material.

4. A system according to claim 1, further characterized in that:

said superconductor material is thin film material.

5. A system according to claim 1, further characterized in that:

at least one of said permanent magnets comprises a trapped flux superconductor magnet.

6. A system according to claim 1, further characterized in that:

said permanent magnets are azimuthally uniform about said rotation axis to less than 0.1%.

7. A system for storing energy in a vertically aligned flywheel suspended by magnetic levitation in a vacuum vessel comprising:

a rotatable member having a vertical central shaft with a rotation axis, said shaft having a lower and an upper superconductor tip on opposite ends thereof;

lower and upper magnetic thrust bearings, having a lifting portion and positioned to support said lower and upper superconductor tips and supported in turn by bearing support means, said lower magnetic thrust bearing having a main direction of lift parallel to said central shaft;

cooling means in thermal contact with said bearing support means; and energy transfer means, connected to said rotatable member, for transferring energy into and extracting energy from said rotatable member, characterized in that:

said lower superconductor tip comprises melt-processed, directionally solidified material structure having a crystal structure C-axis oriented parallel to said main direction of lift.

8. A system according to claim 7, further characterized in that:

said vacuum vessel has a vacuum pressure of less than $10^{-4}$ Torr.

9. A system according to claim 7, further characterized in that:

said superconductor material is bulk material.

10. A system according to claim 7, further characterized in that:

said superconductor material is thin film material.

11. A system according to claim 7, further characterized in that:

at least one of said magnetic bearings comprises a trapped flux superconductor magnet.

12. A system according to claim 7, further characterized in that:

said magnetic thrust bearings are azimuthally uniform about said rotation axis to less than 0.1%.

13. A system for storing energy in a flywheel suspended by magnetic levitation in a vacuum vessel comprising:

a rotatable member having a central shaft, said shaft having first and second magnetic tips on opposite ends thereof;

superconductor magnetic bearings, positioned to support said first and second magnetic tips and supported in turn by bearing support means;

cooling means in thermal contact with said bearing support means; and energy transfer means, connected to said rotatable member, for transferring energy into and extracting energy from said rotatable member, characterized in that:

said vacuum vessel is maintained at a vacuum pressure of less than $10^{-4}$ Torr.

14. A system according to claim 13, further characterized in that:

said vacuum vessel is formed from non-conductive materials.

15. A system according to claim 13, further characterized in that:

at least one of said first and second magnetic tips comprises a trapped flux superconductor magnet.

16. A system for storing energy in a flywheel suspended by magnetic levitation in a vacuum vessel comprising:

a rotatable member having a central shaft, said shaft having first and second superconductor tips on opposite ends thereof;

magnetic bearings, positioned to support said first and second superconductor tips and supported in turn by bearing support means;

cooling means in thermal contact with said bearing support means; and energy transfer means, connected to said rotatable member, for transferring energy into and extracting energy from said rotatable member, characterized in that:

said vacuum vessel is maintained at a vacuum pressure of less than $10^{-4}$ Torr.

17. A system according to claim 16, further characterized in that:

at least one of said magnetic bearings is formed from a trapped flux superconductor.

18. A system according to claim 16, further characterized in that:

said vacuum vessel is formed from non-conductive materials.

19. A system according to claim 3, further characterized in that said bearing includes a thin film of superconductor material formed on said bulk material and having a crystal structure C-axis parallel to said main direction of lift.

20. A system according to claim 9, further characterized in that at least one of said superconductor tips includes a thin film of superconductor material formed on said bulk material and having a solidification axis parallel to said main direction of lift.

21. A system according to claim 3, further characterized in that said bearing includes a thin plate of permeable magnetic material positioned abutting said superconductor material on a side thereof toward a corresponding magnetic tip.

22. A system according to claim 9, further characterized in that said superconductor tip includes a thin plate of permeable magnetic material positioned abutting said superconductor material on a side thereof toward said lifting portion.

23. Apparatus for storing energy in a flywheel suspended by magnetic levitation in a vacuum vessel, comprising:

a rotatable member having a rotation axis in a shaft, said shaft having first and second magnetic tips formed from permanent magnets on opposite ends thereof;

superconductor magnetic bearings, positioned to support said first and second magnetic tips and supported in turn by bearing support means, said superconductor magnetic bearings including a lifting portion structure comprising melt-processed, directionally solidified material having a main direction of lift and having a crystal structure C-axis oriented parallel to said main direction of lift;

cooling means in thermal contact with said bearing support means; and energy transfer means, operable with said rotatable member, for transferring energy with said rotatable member.

24. A system for storing energy in a flywheel suspended by magnetic levitation in a vacuum vessel comprising:

a rotatable member having a shaft with a rotation axis, said shaft having superconductor tips on opposite ends thereof;

magnetic thrust bearings, having a lifting portion and positioned to support said superconductor tips and supported in turn by bearing support means, one of said magnetic thrust bearings having a main direction of lift parallel to said shaft;

one of said superconductor tips comprising melt-processed, directionally solidified material structure having a crystal structure C-axis oriented parallel to said main direction of lift;

cooling means in thermal contact with said bearing support means; and energy transfer means operable with said member for transferring energy with said rotatable member.

* * * * *

UNITED STATES PATENT AND TRADEMARK OFFICE

CERTIFICATE OF CORRECTION

PATENT NO. : 5,214,981

DATED : 06/01/93

INVENTOR(S) : Bernard R. Weinberger et al.

It is certified that error appears in the above-identified patent and that said Letters Patent is hereby corrected as shown below:

Column 3, Line 13, cancel "Y-Ba-Cu-0" and insert -- Y-Ba-Cu-O --;

Column 3, Line 53, cancel "110" " and insert -- 110' --;

Column 5, Line 19, cancel "loses" and insert -- losses --.

Signed and Sealed this

Sixteenth Day of August, 1994

Attest:

BRUCE LEHMAN

*Attesting Officer*

*Commissioner of Patents and Trademarks*